Sept. 19, 1944.  T. F. STACY ET AL  2,358,354
APPARATUS FOR INJECTION MOLDING
Filed Oct. 11, 1941
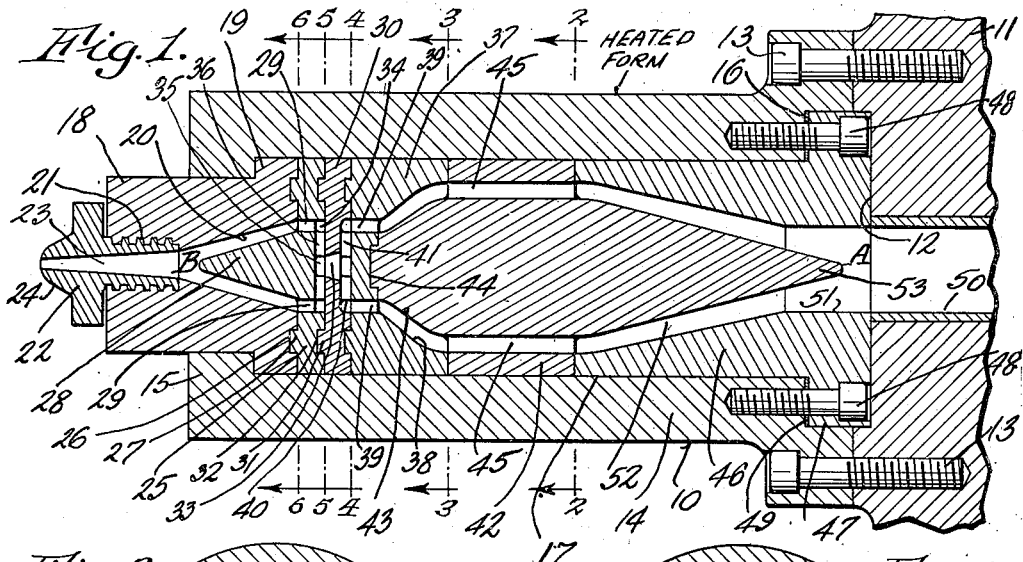
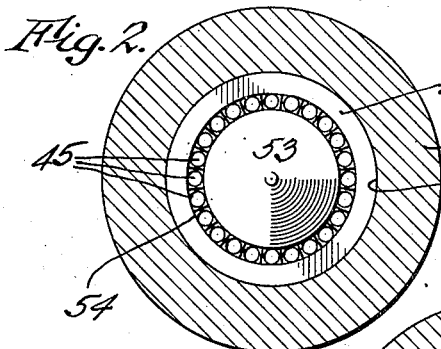
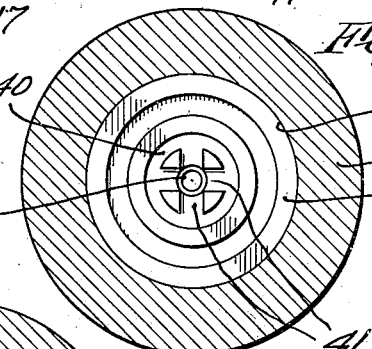
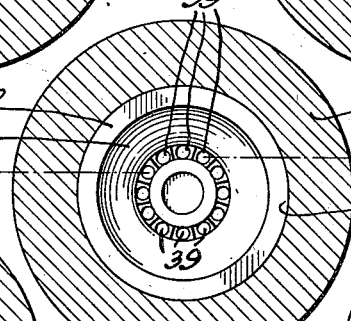
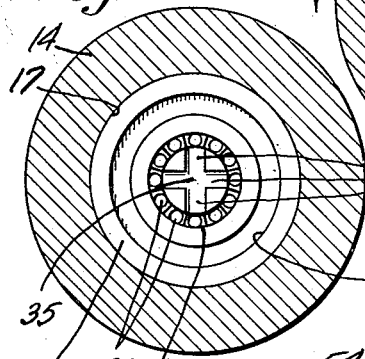
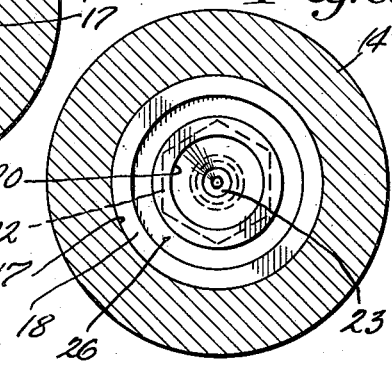
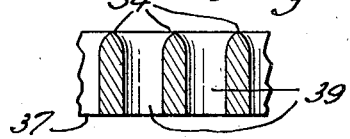
INVENTORS
Thomas F. Stacy
and Joseph E. Stewart
BY
Parker, Brockman & Farmer,
ATTORNEYS Patented Sept. 19, 1944

2,358,354

UNITED STATES PATENT OFFICE 2,358,354

APPARATUS FOR INJECTION MOLDING

Thomas F. Stacy, Piqua, Ohio, and Joseph E. Stewart, Detroit, Mich., assignors to The French Oil Mill Machinery Company, Piqua, Ohio Application October 11, 1941, Serial No. 414,620

8 Claims. (Cl. 18—30)

This invention relates to injection molding, and particularly to the heating of the molding material to reduce it to fluid form during its transfer into a mold. In injection molding as heretofor carried out, difficulties have been experienced in satisfactorily heating the molding material during its transfer to the mold, owing to the fact that while most of the molding material was liquefied by the heat, some of the solid particles thereof remained in suspension in the liquid portion, and were carried over in solid form into the mold which produced a defective molded article. To liquefy the molding material and retain it liquefied for too long a period of time, or to overheat the molding material is also objectionable in many cases, so that it is desirable to keep the time in which the molding material is in fluid form to a minimum and yet insure that all parts of the molding material are fully liquefied before introduction into the mold.

An object of the invention is to provide improved means for heating the molding material during its movement into the mold in a manner to be certain that the molding material is fully liquefied, but not overheated, while keeping to a minimum the interval in which the molding material is subjected to heat.

Another object of the invention is to provide an improved heating device for injection molding apparatus which will insure conversion of all parts of the molding material of each charge into liquid form before introduction into the mold, without increasing the heating temperature and without increasing the size of the heating form or the interval during which it is heated, and which will be relatively simple, efficient, compact, rapid, practical, and inexpensive.

Other objects and advantages will be apparent from the following description of an embodiment of the invention and the novel features will be particularly pointed out hereinafter in connection with the appended claims. In the drawing:

Fig. 1 is a longitudinal sectional elevation through a heated device or form comprising part of an injection molding device, constructed in accordance with this invention and also suitable for performing the improved method in accordance with this invention;

Fig. 2 is a transverse sectional elevation through the same, the section being taken approximately along the line 2—2 of Fig. 1;

Fig. 3 is another transverse, sectional elevation through the same, the section being taken approximately along the line 3—3 of Fig. 1;

Fig. 4 is still another transverse, sectional elevation through the same, the section being taken approximately along the line 4—4 of Fig. 1;

Fig. 5 is another transverse, sectional elevation through the same, the section being taken approximately along the line 5—5 of Fig. 1;

Fig. 6 is another transverse, sectional elevation of the same, the section being taken approximately along the line 6—6 of Fig. 1; and Fig. 7 is a sectional plan of a portion of the same, with the section being taken approximately along the line 7—7 of Fig. 3 to show certain details of construction.

In the illustrated embodiment of the invention, the heated form 10 abuts against the measuring and delivering device 11. The device 11 is provided with a recess 12 in the end against which the heated form abuts, and the heated form has an end projection which sets into the recess 12 and properly aligns the form 10 and device 11. The form 10 is removably connected to the device 11 in any suitable manner, such as by screws 13 which pass through a flange on the heated form and are threaded into the body of the delivering device 11. The heated form 10 includes tubular sleeve 14 which, at one end, has an external peripheral flange through which the screws 13 are passed and which at its other end has an internal, peripheral flange 15. The end of this sleeve 14 with the flange through which the screws 13 pass is provided in its end face with a countersunk recess 16 which extends entirely around, opens into, and is concentric with the bore 17 of the sleeve.

A bushing 18 extends through the end opening in the sleeve 14 formed by the internal annular flange 15 and closes that opening, and this bushing has, at its inner end, an outwardly extending flange 19 which fits the bore 17 of the sleeve 14 and abuts against the inner side face of the flange 15 so as to limit the movement of the bushing 18 in a direction along, but outwardly of, the sleeve. The bushing 18 extends outwardly beyond the flange 15 of the sleeve 14, and has a passage 20 from end to end. The inner end of this passage is frustro-conical with its larger base forming the end of the passage at the inner end face of the bushing. The smaller base of the frustro-conical zone of the passage, is disposed intermediate the ends of the bushing and opens into a somewhat larger but threaded passage or bore 21 in which is threaded one end of a nozzle 22.

The nozzle has a tapered passage 23 from end to end with the larger end thereof coincident with the small base of the frustro-conical passage zone in the bushing 18. Thus the frustro-conical passage zone in the bushing 18 and the tapered passage 23 in the nozzle 22 together form a progressively converging passage. The outer end of the nozzle 22 is convexly curved as at 24 so as to enter a recess (not shown) in the mold and form a seal therewith when the mold is pressed thereagainst, ready to receive a charge of fluid molding material. A baffle plate 25 which also fits the bore 17 is disposed flat against the inner end face of the bushing 18 within bore 17, and the abutting faces of the baffle plate 25 and the inner end face of the bushing 18 have a cooperating annular tongue and groove connection so as to be in slightly telescopic relation with each other. In the illustrated example, the inner end face of bushing 18 is provided with an annular groove 26 which is concentric with the axis of the passage 20, and the baffle plate 25 has an annular rib 27 which enters and fills the groove 26, so as to interlock the baffle plate 25 to the end of the bushing 18. The baffle plate 25 is provided on its end face toward the bushing 18 with a conical projection 28, the base of which is approximately coincident with the inner end face of the bushing 18 and concentric with the passage 20. Thus this conical projection 28 extends from the plate 25 into the frustro-conical passage zone of the passage 20 in the bushing 18 to provide in the bushing 18 a converging annular passage in which the direction of convergence is outwardly of the bushing 18. The plate 25 is provided with a plurality of small apertures 29, which extend therethrough from face to face and are arranged in a circular row about the large base of the conical projection 28.

Abutting against the plate 25 is another baffle plate 30 which also fits the bore 17 and abuts against the plate 25. The plate 30 has an annular rib 31 on its face abutting the plate 25, which enters and fills a corresponding annular recess 32 in the face of the plate 25 against which the plate 30 abuts so as to provide an interlock between two baffle plates. The plate 30 is provided with a center aperture 33 which extends from face to face therethrough and is preferably convergingly tapered in a direction toward the plate 25. The face of the plate 25 against which the center zone of the plate 30 abuts is provided with an annular groove or recess 34 which is aligned with the circular row of apertures 29, and also with a center recess 35 which is aligned with the smaller end of the passage 33 in the plate 30. The face of the plate 25 having recess 34 is also provided with radially extending grooves 36 which connect the annular groove 34 with the center recess 35 to provide a plurality of passages that connect the smaller end of the passage 33 in the plate 30 with the annular recess 34 that opens into the circular row of apertures 29. The latter in turn open into the larger base end of the tapered passage at the inner end of bushing 18.

Abutting against the plate 30 is a tubular member 37 which also has an annular rib on its face abutting plate 30 entering a corresponding annular recess in the abutting face of plate 30 so as to interlock the member 37 with the plate 30. This member 37 is provided in its right hand end face, Fig. 1, with a large recess or cavity 38 having tapered side walls leading to a bottom of smaller diameter than the open large end of the recess. The member 37 also has a circular row of small apertures 39 which extend from the bottom of the recess 38 to the opposite face of the member 37. This circular row of apertures 39 is approximately concentric with the central aperture or passage 33 of the plate 30. The face of plate 30 against which member 37 abuts is provided with an annular groove 40 which is aligned with the circular row of apertures 39, and which opens into those apertures. Plate 30 also is provided with a plurality of radially extending grooves 41 which connect the annular groove 40 with the passage 33, shown clearly in Fig. 4.

Abutting against the member 37 is a member 42 which has a tapered projection 43 on the face abutting member 37. This projection extends into the recess 38, abuts against the bottom of that recess within the circular row of apertures 39 and its free end is provided with a tongue or boss 44 which enters and fills an aligned shallow recess in the bottom wall of the recess 38, so as to form an interlock between the members 42 and 37. The projection 43 is spaced from the wall of the recess 38 so as to form a converging tubular passage. The member 42 is provided with a circular row of apertures 45 which extend from face to face on the outward side of the projection 43.

Within and fitting bore 17 of the sleeve 14 is still another member 46 which abuts against the right hand face of the member 42, and which at its right hand end in Fig. 1 is provided with an outwardly extending, peripheral flange 47 which fills the recess 16 in the right hand end face of the sleeve 14. The right hand end of the member 46 extends slightly beyond the adjacent end face of the sleeve 14 and into the recess 12 in the end of the delivery member 11. Thus the flange 47 by its entry into the recess 12 provides an interlock between the heated form and the member 11. The flange 47 is fixed in position in the sleeve 14 in any serviceable manner such as by screws 48 that pass through the flange 47 and into the abutting end of the sleeve 14, and, if desired an annular gasket or shim 49 may be disposed between the flange 47 and the adjacent end of sleeve 14.

The member 11 is provided with a delivery passage 50 along which the charges or batches of molding material is divided, solid form are moved by increments and the member 46 is provided with a passage 51 which is aligned with, and of the same size as, the abutting end of passage 50 in member 11. The passage 51 at some distance from its junction with the passage 50 becomes progressively larger so as to provide a diverging zone 52 which at its larger end or base is aligned with and opens into the circular row of apertures 45 in the member 42. The member 42 is provided at its right hand end in Fig. 1, with a tapered projection 53 which extends into the passage 51 a slight distance beyond the small end of diverging zone 52. The projection 53 is spaced from the wall of the passage 51 and the wall of zone 52 so as to provide a resultant passage which is annular in cross section and frustro-conical in shape. Thus when the molding material is moved along passage 51 into zone 52, the material will be given a tubular form of small thickness which diverges in a direction away from the passage 50 and towards the row of apertures 45.

From the foregoing description it will appear that the heating form 10 has a continuous passage from end to end, which conveys the molding material, received from passage 50 through a tortuous path to the nozzle 22 from which it is discharged into the mold in a manner well understood in injection molding. The material as delivered by passage 50 is in solid but divided condition and the form 10 is heated in any suitable or usual manner such as by the application of external heat or by heating elements within the parts comprising the form 10, or by providing steam ducts running through the parts comprising the form 10. The exact manner in which the form 10 is heated is immaterial in the present invention and since the means for such heating are well known in the art, a disclosure thereof has been omitted in the interest of brevity. Because of the heating of the parts comprising the form 10, the walls of the tortuous passage through this form 10 are also heated and as the material moves through the form 10 it will be heated until it becomes fluid and flows freely by the time it reaches the nozzle 22.

The material moving along the passage 51 divides into a tubular form of shallow thickness which is spread by the projection 53 until it reaches the circular row of apertures 45 in the member 42, and then the mass divides and passes through 42 as a plurality of small cylindrical streams. These small cylindrical streams then are recombined in the converging passage 38 and form a tubular stream with shallow thickness which is delivered to the circular row of apertures 39 in the member 37. The apertures again divide the stream into a plurality of small cylindrical streams which recombine in the annular groove 40 in the baffle plate 30 but promptly separate again, into a plurality of smaller streams which pass along the radially extending grooves 41 in the face of the plate 30.

These radially moving streams again recombine as they reach the larger end of the passage 33 and pass through the converging passage 33 into the recess 35 in a face of the plate 25. The stream is then again subdivided into a plurality of radially moving streams which are conducted by the grooves 36 outwardly to the recess 34 where they recombine and at once are redivided into a plurality of small cylindrical streams that pass through the apertures 29 in plate 25. The small streams leaving the apertures 29 in plate 25 recombine as they enter the larger end of the converging passage 20 and form a converging stream that is delivered to nozzle passage 23. The molding material, which is now entirely liquefied is delivered to the mold. For convenience of reference the approximate beginning of the heated zone is designated by the letter A in the passage 51, and the approximate end of the heated zone is designated by the letter B in the passage 20 of the bushing 18.

It will be noted that the stream of material received from the passage 50 is first spread out as a thin, relatively tubular mass in the passage zone 52, then divided into small cylindrical streams in apertures 45, recombined, and speeded up in passage 38, redivided and further speeded up in apertures 39, recombined in groove 40, given an abrupt and approximately right angular change in direction and subdivided, then moved radially along the plate 30 in grooves 41 until the restricted center passage 33 is reached where the entire stream is united and discharged through the restricted and convergingly tapered passage 33. It will be noted that the individual streams approaching and leaving the passage 33 are moving relatively fast and are given abrupt, approximately right angular changes of direction. They recombine as they enter the passage 33 and are again given an abrupt, approximately right angular change of direction and divided as they leave the passage 33. They are also given an abrupt approximately right angular change of direction as the material passes through the groove 34 and enters the circular row of apertures 29.

The succession of abrupt, approximately right angular changes of direction in the flow of the molding material occurs near the end of the passage of the stream through the heated form 10, and after the larger part of the molding material has been reduced to fluid form, so that the flow through such abrupt, tortuous passages produces an eddying of the fluid that causes any solid particles of the molding material that may be carried in suspension in the fluid part of the molding material to be brought near the outside surface of the stream or streams and thus be heated from the passage walls. Any desired number of baffle plates 25 or 30 may be employed in order to give sufficient abrupt changes in direction to the stream of molding material, to insure full conversion of the entire stream into liquid condition before it reaches the nozzle 22.

It will also be observed that these abrupt, sharp changes in the direction of flow of the stream of molding material occur in the last half of the travel of the material through the heated form as the material rapidly approaches and leaves the very restricted passage 33 in the baffle plate 30, and after a sufficient amount of the molding material in the stream has been rendered fluid so that the material can be given an abrupt change in direction of movement without blocking the passage. Such abrupt changes in direction of flow cause eddying of the liquid that brings any unliquefied material that is carried in suspension in the fluid part of molding material, into close heating engagement with the heated walls of the passage, where they are fully liquefied and rendered fluid before reaching the nozzle. This insures that no solid parts of the molding material will be carried in suspension into the mold with resulting defects in the molded articles.

In order to reduce the friction or resistance caused by the subdivision of the moving stream of molding material into smaller streams at passages or apertures 29, 39, and 45, the walls between the apertures at the entrance ends thereof will be bevelled off or tapered as at 54 in Fig. 7.

From the foregoing it will be apparent that the molding material which is delivered in charges or increments through passage 50, will be first heated while moving relatively slowly and without abrupt changes in direction of flow or movement, until the molding material becomes reasonably fluid and then it is given such an intimate mixing with abrupt changes of direction of flow with increased rate of flow that no solid particles of the molding material can reach the nozzle 22. It will also be observed that this is accomplished without increasing the temperature of the component parts of the heating form, and without overheating any part of the molding material.

It will also be apparent that with this invention, the pocketing of heated material, which would eventually lose its plasticizing agent and burn, thus contaminating the whole, is avoided. All particles of the molding material must be kept moving.

It will be understood that various changes in the details and arrangements of parts, and in the steps of the improved method, which have been herein described and illustrated in order to explain the nature of the invention, may be made by those skilled in the art within the principle and scope of the invention as expressed in the appended claims.

We claim:

1. In an injection molding device of the type in which charges of the molding material are introduced in divided solid form into one end of a heating device and advanced by increments of movement therethrough where they are liquefied and delivered in a liquid condition as a stream, that improvement in the heating device which comprises a form having a heated passage extending in a generally lengthwise direction therethrough for said molding material and in which the material is heated in transit, said passage at a zone thereof between the limits where the heating begins and ends including portions which extend approximately transversely to said lengthwise direction and connect by abrupt corners with contiguous portions of the passage to mix the material passing the said zone and bring unliquefied particles suspended in the liquefied portion of the molding material into proximity to the walls of said passage to facilitate complete liquefication of the molding material in said passage.

2. In an injection molding device of the type in which charges of the molding material are introduced in divided solid form into one end of a heating device and advanced by increments of movement therethrough where they are liquefied and delivered in a liquid condition as a stream, that improvement in the heating device which comprises a form having a heated passage therethrough for said molding material and in which the material is heated in transit, said passage at a zone thereof between the limits where the heating begins and ends being constricted and at both sides of and in close proximity to the constriction having connecting passage portions disposed at relatively sharp angles to one another to cause abrupt changes in direction of flow in a manner to mix the material passing the constriction and bring unliquefied particles suspended in the liquid portion of the molding material into proximity to the walls of said passage to facilitate complete liquefication of the molding material in said passage.

3. In an injection molding device of the type in which charges of the molding material are introduced in divided solid form into one end of a heating device and advanced by increments of movement therethrough where they are liquefied and delivered in a liquid condition as a stream to a mold, that improvement in the heating device which comprises a hollow heating form with an inlet at one end, a delivery nozzle connection at the other end, and a plurality of thin, tubular passage zones connected in series to one another by a non-tubular passage zone, to form a passage between inlet and said nozzle connection, and an annular flange projecting into said non-tubular passage zone from the periphery of the latter beyond the adjacent ends of said tubular zones to cause abrupt changes in the direction of flow and eddying of said stream in a radial direction while moving from one tubular zone to the other, whereby any unliquefied particles in suspension in the liquefied material passing said non-tubular zone will be brought into closer heat exchanging relation to the walls of said passage zones and complete liquefication of the molding material aided.

4. The molding device substantially as set forth in claim 3 in which the faces of said flange and the faces of said form at the ends of said non-tubular passage, cooperate to form a plurality of individual channels along both faces of said flange and running in the directions generally radially of the axis of said non-tubular passage zone to increase the heat transfer to the liquid passing through said form at said non-tubular passage zone.

5. In an injection molding device of the type in which charges of the molding material are introduced in divided solid form into one end of a heating device and advanced by increments of movement therethrough where they are liquefied and delivered in a liquid condition as a stream to a mold, that improvement in the heating device which comprises a sleeve having an inturned flange at one end and an unrestricted opening into its other end, a bushing disposed within said sleeve to project through its said one end and having within the sleeve an outwardly extending flange to engage the inturned flange of said sleeve to prevent ejection of said bushing by pressure within said sleeve, said bushing having a passage therethrough from end to end, the outer end of said passage being formed to receive and hold a delivery nozzle, the inner end portion of said passage being approximately conical with its base toward the inner end of the sleeve, a plate within the sleeve and abutting flat against the inner end of said member and having a somewhat conical projection extending into said conical passage but spaced from the walls thereof, said plate having a circular row of apertures from face to face outside of the base of said projection, a second plate abutting flat against said first plate and having an aperture therethrough from face to face within an area aligned with said base of said projection, a member abutting against said second plate and having a circular row of apertures therethrough concentric with said aperture in said second plate but spaced radially therefrom a substantial distance, the abutting faces between said first and said second plates, and between said second plate and said member, having between them a central chamber aligned with said passage in said second plate, an annular recess spaced radially away from said chamber but approximately aligned with said adjacent circular row of apertures, and radially progressing grooves connecting said central chamber and said annular recesses, providing abrupt changes in direction of flow as the molding material approaches and leaves said second plate and said passage therethrough, and means also in said sleeve and abutting said member for heating the molding material without abrupt changes in direction of flow as it approaches said member.

6. In an injection molding apparatus of the type in which molding material in divided solid form is introduced into one end of a heating device and advanced therethrough and by which the material is liquefied and delivered in a liquid condition to a mold, that improvement in the heating device which comprises a hollow heating form having an inlet, a nozzle connection distant therefrom, and a passage for the material from said inlet to said nozzle connection, a baffle plate arranged transversely to the lengthwise direction of said passage and having a central aperture extending therethrough, members arranged at and abutting opposite faces of said plate and each having a plurality of non-central apertures therethrough, the abutting faces of said plate and members forming radially progressing recesses which connect said central aperture of the plate with said non-central apertures of said members and together with said central and non-central apertures constitute portions of said passage for the material and act to cause abrupt changes in the direction of flow of the material through said device and aid in complete liquefication of the molding material.

7. An injection molding heating device according to claim 6, in which said flow passage for the molding material is constricted in its delivery direction at the inlet and delivery sides of said baffle plate.

8. In an injection molding device of the type in which charges of the molding material are introduced in divided solid form into one end of a heating device and advanced by increments of movement therethrough where they are liquefied and delivered in a liquid condition as a stream, that improvement in the heating device which comprises a form having a heated passage extending in a generally lengthwise direction therethrough for said molding material and in which the material is heated in transit, said passage at a zone thereof between the limits where the heating begins and ends including spaced portions of annular cross sectional shape, a portion between said annular portions and disposed substantially axially with respect thereto, and portions at each side of said axial portion which extend angularly relatively to and connect with said annular and axial portions, to mix the material passing through said portions and bring unliquefied particles suspended in the liquefied portion of the molding material into proximity to the walls of said passage to facilitate complete liquefication of the molding material in said passage.

THOMAS F. STACY.
JOSEPH E. STEWART.